United States Patent [19]

Knobel

[11] Patent Number: 5,000,069

[45] Date of Patent: Mar. 19, 1991

[54] ROTARY CUTTER

[75] Inventor: Larry R. Knobel, Richford, N.Y.

[73] Assignee: Ithaca Peripheral Inc., Groton, N.Y.

[21] Appl. No.: 418,328

[22] Filed: Oct. 6, 1989

[51] Int. Cl.[5] .............................................. B23D 25/00

[52] U.S. Cl. .............................................. 83/285; 83/341; 83/342

[58] Field of Search ................. 83/285, 298, 341, 342, 83/349, 582, 596, 672

[56] References Cited

U.S. PATENT DOCUMENTS

| | | | |
|---|---|---|---|
| 3,552,251 | 1/1971 | Neff | 83/342 |
| 3,750,510 | 8/1973 | Gabriels | 83/341 |
| 4,114,491 | 9/1978 | Hashimoto et al. | 83/349 |
| 4,362,076 | 12/1982 | Sasaki et al. | 83/285 |
| 4,949,606 | 8/1990 | Pfeiffer | 83/342 |

*Primary Examiner*—W. Donald Bray

*Attorney, Agent, or Firm*—Wall and Roehrig

[57] ABSTRACT

A paper cutter has a cutter bar and rotary cutting blade that cooperate to slit a continuous web of paper passing therethrough across the entire width thereof. A cam is provided on one end of the cutter roll which lifts the cutter bar out of operative contact with the cutter roll and blade for a portion of a revolution of the cutter roll. The cutter bar is spring-urged into contact with the cutter roll and the cutter roll is axially shifted along the cutter bar to move the cam into and out of contact with the cutter bar to selectively disable the slitting of the paper web for a small portion of the width thereof to allow discreet individual portions of the web to remain connected together for further operations at another location. The cutter roll is driven by a motor, and is axially shifted by solenoid lever arrangement to position it relative to the cutter bar.

13 Claims, 4 Drawing Sheets

ROTARY CUTTER

BACKGROUND OF THE INVENTION

This invention relates to paper cutting devices, and more particularly to rotary cutters for cutting a continuous web of paper as it passes through and exits a machine.

Printed output from various types of information printing devices such as computers, order entry machines, accounting machines, etc. is frequently produced on a continuous roll of paper fed past a printing head or station. This has necessitated the provision of cutoff devices for severing the roll of paper into separate sheets or message units which have ranged from simple serrated tear-off bars for manual separation to high-speed automatic cutters for severing the roll of paper at predetermined intervals.

Alternatively, continuous forms are pre-perforated for later separation after exiting the printing machine. These mechanisms have served a useful function, but have not met the need to be able to feed out constantly varying lengths of printed material partially severed but still attached sufficiently for transport and later separation.

With the prior art cut-off mechanisms or pre-perforated forms, message formats and/or separation requirements have seriously limited the type and form of output.

The present invention solves this problem by providing a cut-off for a continuous roll of paper that can be selectively positioned to completely sever the web of paper or to partially sever the web, leaving a desired joining tab to connect sequential message units at any desired interval of paper feed.

OBJECTS AND SUMMARY OF THE INVENTION

Accordingly, it is an object of the present invention to provide a rotary cutter mechanism for selectively severing only a portion of the full web of paper passing through the device to allow individual messages printed on the paper to remain attached as they exit the machine.

It is another object of the present invention to provide a cutter for continuous rolls of paper that will quickly and efficiently cut the web a desired amount to partially or totally sever segments therefrom.

It is another object of the present invention to provide a rotary paper cutter that can be selectively positioned to cut the entire web of paper passing therethrough or alternatively to cut only a portion of the width of a paper web passing therethrough.

It is another object of the present invention to provide a rotary cutoff device for a continuous roll of paper that will make a sharp, clean shear cut across the web.

It is another object of the present invention to provide a cutting blade and cutter bar edge that cooperate to perform a sharp clean shearing of the paper web.

BRIEF DESCRIPTION OF THE DRAWINGS

These and other and further objects of the present invention, together with additional features contributing thereto, and advantages accruing therefrom, will be apparent from the following description of a preferred embodiment which is shown in the accompanying drawings wherein.

DETAILED DESCRIPTION OF THE PREFERRED EMBODIMENT

Figure 8:
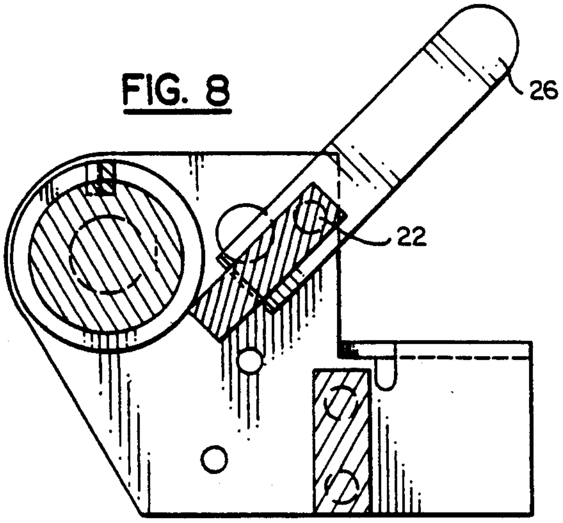
FIG. 8 is a sectional view taken on line 8—8 of FIG. 2.
Figure 1:
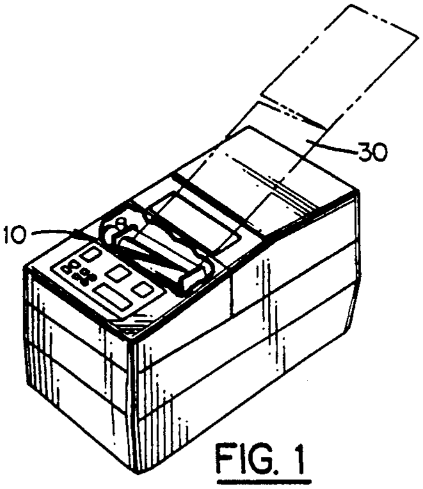
FIG. 1 is a perspective view of a printing machine for printing on a continuous web of paper.

Referring now to FIG. 1, there is shown a machine for printing material on a continuous web of paper fed from a supply roll (not shown) through the printing mechanism and past a cutting device at the exit portion of the machine. The cutting device 10 is shown in the partial cutting condition which severs a substantial portion of the paper web, but does not totally sever it as it exits the printing machine. The partially severed individual segments of the paper web are continuously held together by the unsevered edge portion so that a number of individual segments can be easily and simply transferred to another location without risk of loosing one or more. Subsequently, the individual segments can then be easily separated one from the other as and when desired.

Figure 2:
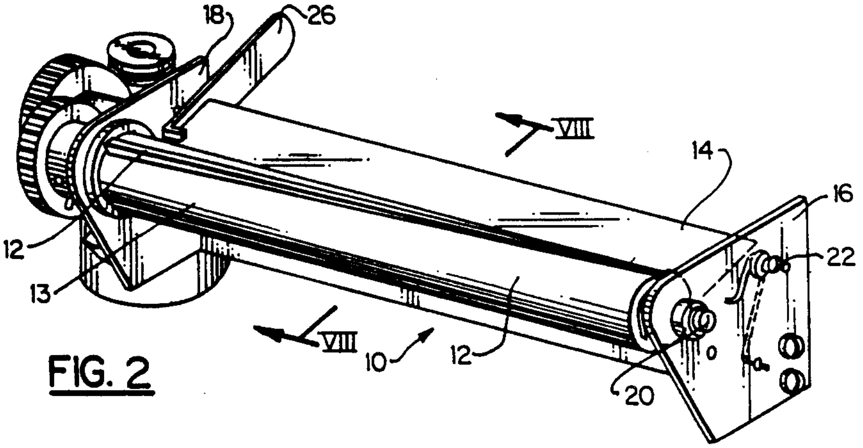
FIG. 2 is an enlarged perspective view of the cutting bar and cutting knife of the present invention.
Figure 3:
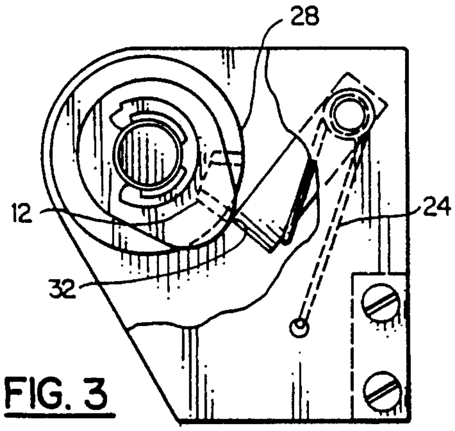
FIG. 3 is a right-hand end view of the cutting assembly of FIG. 2 in the partial cutting configuration.

Referring now to FIG. 2, the rotary cutting mechanism 10 of the present invention includes a cutting blade 12 mounted on a roll 13, and a cutter bar 14, which cooperates with blade 12 to shear a web of paper passing therebetween. Bar 14 is pivotally mounted between end plates 16 and 18 on shaft 22. Roll 13 is mounted on shaft 20, positioned between end plates 16 and 18, for rotation thereabout. As shown in FIG. 3, the cutter bar 14 is normally spring-biased into engagement with the cutter roll 13 by spring 24, which is mounted on the right-hand end plate 16 of FIGS. 2, 5 and 6. At the other end of the assembly there is shown a manual lever 26 which is pivotally mounted on shaft 22 at the left end of FIG. 2 and which has an L-shaped foot with a slot 27 cut therein adapted to fit over the cutter bar 14 so as to be able to manually override the spring 24 and to lift the cutter bar 14 from the cutter roll 13, as desired. This also may be seen in the FIG. 7 exploded view.

Cutter bar 14 has its axis offset slightly relative to the axis of roll 13. The pivot point of shaft 22 in the right hand end plate 16 is actually closer to the axis of the roll 13 than the pivot point of shaft 22 in end plate 18 by approximately 0.020" to 0.030". This construction insures good shearing contact with the blade 12 as the bar 14 is actually "lifted" slightly against spring 24 as the blade 12 rotates underneath it.

The cutter bar 14 and cutting blade 12 on roll 13 are arranged to perform a scissor-like motion across the paper web extending out of the device 10 as roll 13 is rotated. The cutting blade 12 is a straight rectangular bar that is fixed in a slot cut in roll 13. The slot is cut in the roll 13 at an angle to the axis of roll 13, the bar is mounted in the slot and then the outer surface of the bar is ground to match the radius of the collar 28 fixed on the left hand end thereof as shown in FIGS. 3-6. The cutting blade 12 cooperates with the cutting bar 14 to shear the paper similar to the way a lawn mower, or other rotary-type cutter, operates.

The bar 14 is pivotally mounted in the frame members 16 and 18 so that surface 36 will form an angle greater than ninety degrees with the radius of roll 13 at the point of contact of edge 32 and roll 13. Cutting blade 12 is ground with a relief on the trailing edge so that the sharp shearing action along the leading edge is enhanced as it contacts edge 32 on bar 14. This configuration, it has been found, produces an efficient and sharp shearing of the paper web without tearing or forming fuzzy edges. It also results in a long wearing shearing blade.

Referring now to FIGS. 3-6, the roll 13 has at its left hand end a collar 28 and at its right hand end a cam 46. Collar 28 has a diameter greater than roll 13 and equal to the effective diameter of cutting blade 12. Cutter bar 14 rides on collar 28 at its left hand end and thus is held in shearing relation with cutting blade 12 to shear the paper web extending between roll 13 and cutter bar 14 when roll 13 is rotated.

The paper web 30 is fed through the printing device and the cutter device 10 by feed rolls not shown. When the cutting device is at rest, the web can pass between the roll 13 and the shearing edge 32 of bar 14 without cutting the web. Thus, any desired length is fed out of the device and then the cutter is actuated.

The cutter device 10 may be manually actuated, but preferably it is powered by a motor 52 which, when actuated drives roll 13 through gears 54, 55 and 56. Rotation of roll 13 will shear the web 30 of paper as described above.

Figure 7:
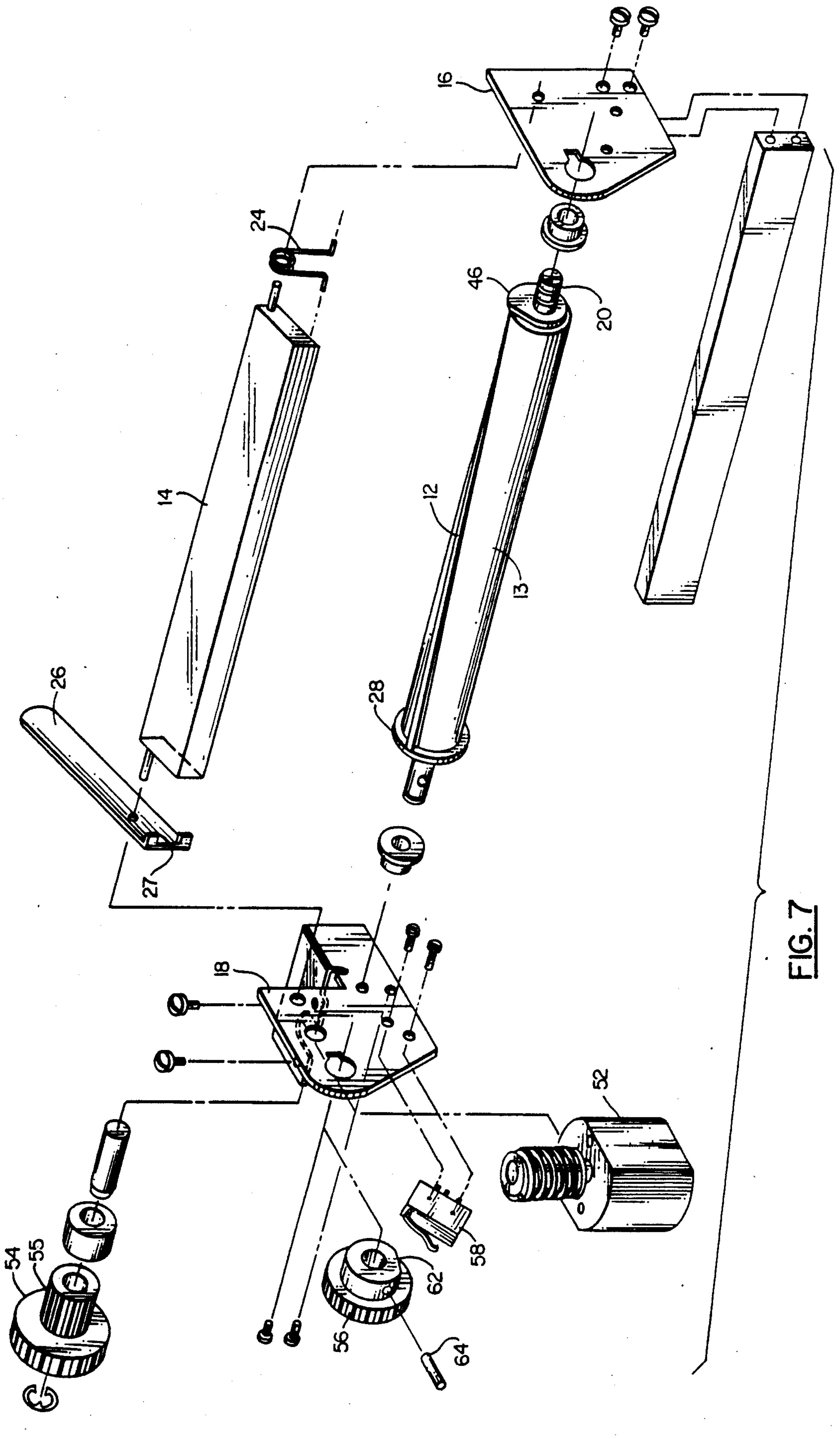
FIG. 7 is an exploded view showing the detailed components of the cutter bar and rotary knife assembly of the present invention.

Suitable control circuitry (not shown) can be provided to turn on motor 52 when desired. Motor 52 is stopped by micro switch 58 riding on the shoulder 60 of gear 56 when it hits the flat 62 which opens the drive circuit (FIG. 7). Gear 56 is secured to shaft 20 by pin 64. Thus, shaft 20 will normally be stopped at a position to maintain blade 12 on roll 13 out of contact with bar 14 to permit the feeding of a paper web between roll 13 and bar 14.

Figure 4:
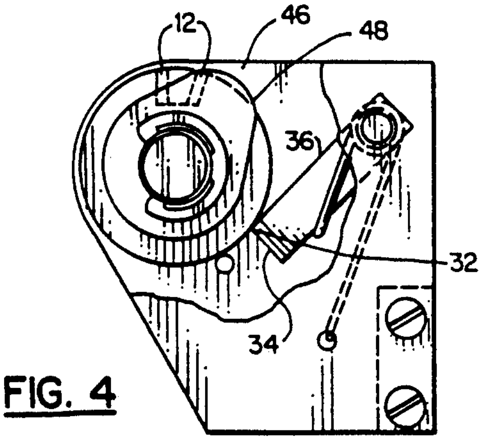
FIG. 4 is a view similar to FIG. 3 with the cutting knife and bar in the full cutting position.
Figure 5:
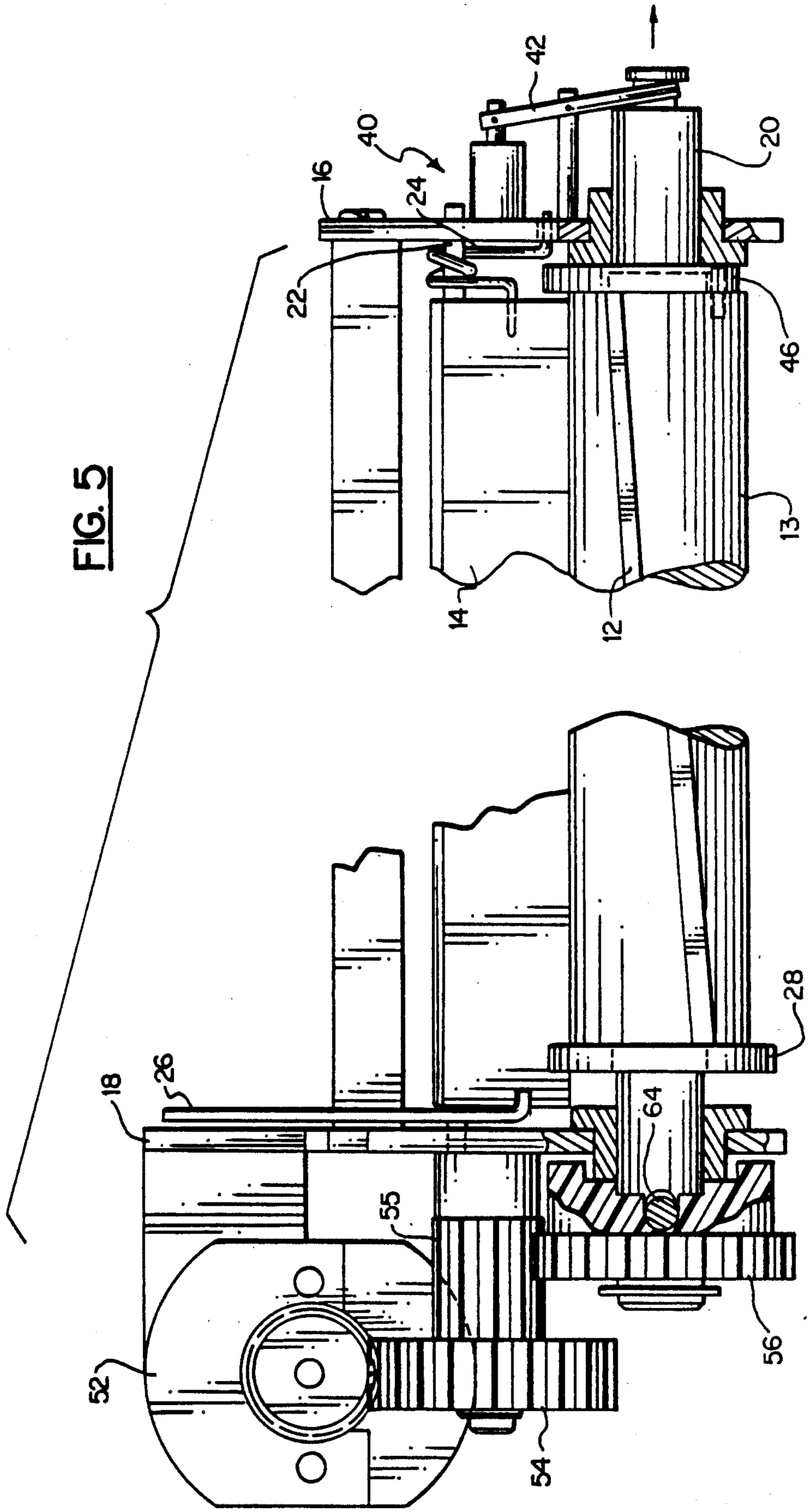
FIG. 5 is an enlarged top plan view, partially broken away, of the cutter bar and cutting knife in the full cut position.
Figure 6:
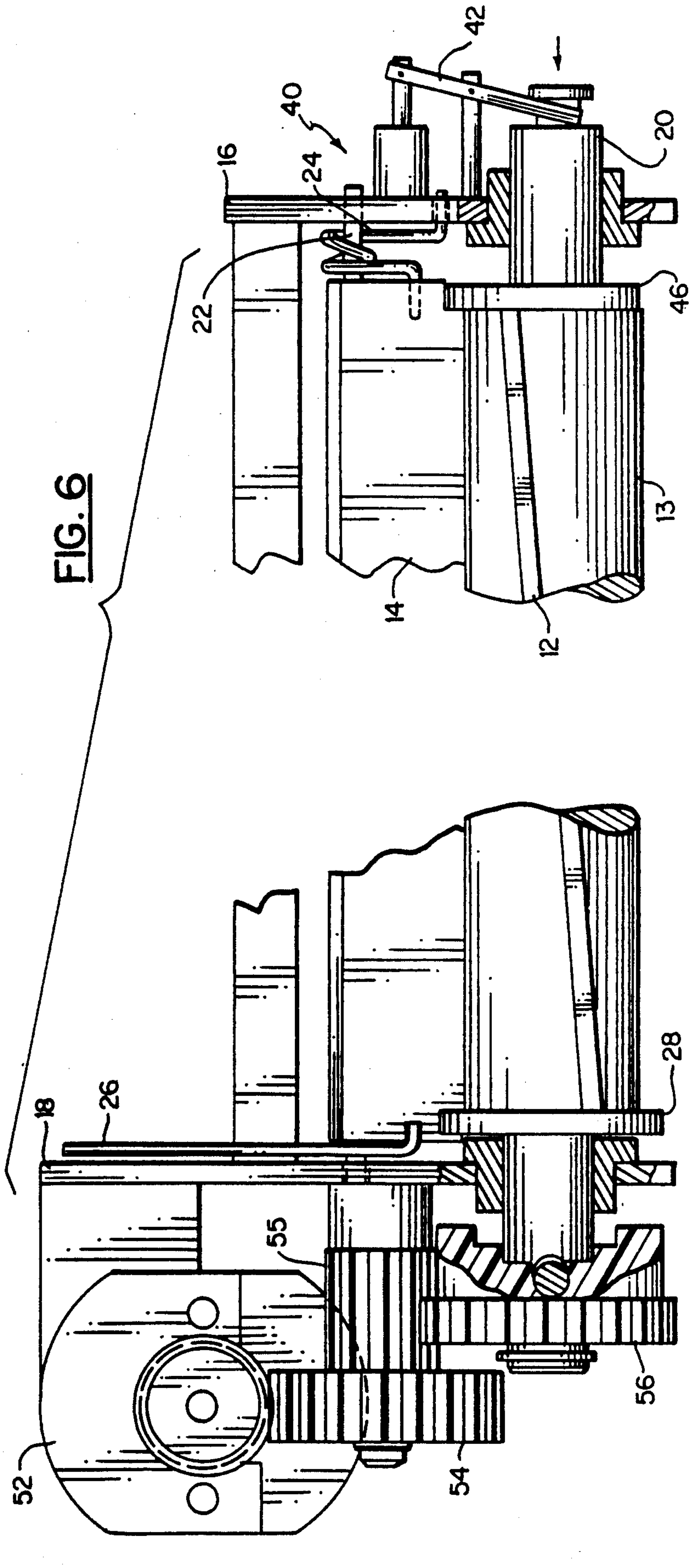
FIG. 6 is a view similar to FIG. 5 showing the cutter bar and cutting knife in the partial cut position.

Referring now to FIGS. 5 and 6, there is shown the cutting blade 12 and roll 13 in a shifted and a non-shifted position. As described above, the roll 13 has affixed to the right end a cam. Cam 46 is generally elliptical, as may be seen in FIGS. 3 and 4 with its maximum diameter greater than collar 28 so as to physically lift the cutter bar from contact with the cutting blade 12 when in the position of FIG. 6. As can be seen, the entire roll 13 is shifted to the right in FIG. 6 from the position of FIG. 5 by the solenoid assembly 40 mounted on the outside of end plate 16. In this position, cutter bar 14, while still riding on collar 28 at its left hand end has its right hand end positioned over cam 46 so that it will ride on the apex portion 48 as roll 13 is rotated to lift the bar out of cutting contact with cutting blade 12. The duration of the "out of contact" condition, and hence non-shearing action is determined by the width of the apex, and its position vis-a-vis the blade 12. These are chosen to provide the desired width of the tab or continuous uncut portion of the web 30 as seen in FIG. 1.

In normal operation, as shown in FIG. 5, the paper is fed between the roll 13 and the cutter bar 14 a desired length and stopped. The paper itself is fed by feed rolls within the machine. The motor 52 is then actuated. As the roll 13 rotates, the cutting blade 12 will begin to shear the paper, starting at the right-hand end of FIG. 5, and proceeding to the left-hand end, as the roll 12 rotates. As shown in FIG. 5, the entire web of paper resting between the end collars of the roll 13 will be severed and a discreet, individual sheet of paper will issue from the machine.

When it is desired to leave the discreet individual pieces of paper connected together, solenoid assembly 40 is actuated to move lever 42 to the position shown in FIG. 6 which shifts the roll 13 to the left in FIG. 6 so that the right-hand collar 46, which is in the shape of a cam as shown in FIGS. 3 and 4, can now engage the cutter bar 14. When the apex section 48 of the cam 46 contacts the cutter bar, it will lift it from contact with the cutting blade 12, as can be seen in FIG. 3. This will stop the cutting action as the roll 13 rotates and will allow the paper to remain connected through a small tab on the right-hand margin, as shown in FIG. 1.

Cutter roll 13 can be rotated continuously, or it can be selectively energized on a single revolution basis when desired for a cutoff operation. Obviously, for this partially severed condition, solenoid 40 would have to be maintained in the shifted position, and could either be continuously energized or could be a two-position solenoid with a detent to hold it at either of its energized positions. It will be understood that while we have shown a solenoid actuated lever for shifting the cutting roll 13 axially from right to left, and back, that this could be accomplished by a mechanical lever and a detent, or similar configuration for selectively positioning the cutting mechanism in the complete cut or partial cut mode.

It is possible with this device to feed indeterminate lengths of paper web through the machine and then to trigger the cutting action by energizing motor 52 to rotate roll 13 to cause blade 12 to shear the web against the cutter bar. Solenoid 40 can also be selectively energized to move bar 14 off the cam 46 or not, as desired. In this way, varying lengths of messages can be printed on the different sections of the web to meet varying operational requirements. Also, it will be understood that the solenoid 40 may be actuated for a predetermined length of time to the position shown in FIG. 6 and then moved to the position shown in FIG. 5.

There is thus provided a very flexible, simple and foolproof method of cutting a continuous web of paper in accordance with a wide variety of requirements as to length of the individual segments and whether or not they are to be completely cut off or only partially cut off, and retained in a continuous partially severed condition.

While the invention has been described in the specification and illustrated in the drawings with reference to a preferred embodiment, it will be understood by those skilled in the art that various changes may be made and equivalents substituted for elements of the invention without departing from the scope of the appended claims.

What is claimed is:

1. A rotary paper cutter for cutting a continuous web of, paper which comprises a frame member, a cutter roll having a cutting blade fixed thereon rotatably mounted in said frame member, a cutter bar pivotally mounted in said frame for contact with said blade to cut a web of paper positioned therebetween, cam means for moving said cutter bar out of contact with said blade for at least a part of a cutting cycle thereof, and means for selectively actuating said cam means into and out of contact with said cutter bar so that the width of cut on a web of paper positioned between the cutter roll and the cutter bar can be controlled.

2. A device as described in claim 1 wherein said cam means comprises an elliptical cam mounted on one end of said cutter roll, said cam having an apex portion adapted to contact said cutter bar to lift said cutter bar from cutting engagement with said cutter roll for at least part of a revolution of said cutter roll.

3. A device as described in claim 2 further defined by said means for actuating said cam means including a pivoted lever for shifting the cutter roll axially to move said cam means into and out of engagement with said cutter bar.

4. A device as described in claim 3 wherein said lever means includes a solenoid for actuating the lever from one position to the other.

5. A device as described in claim 1 wherein said cutter roll and blade comprise a cylinder, having a circular collar on one end, a rectangular groove cut in said cylinder at an angle to the axis thereof, a rectangular bar fixed in said slot, and said outer surface of said rectangular bar being ground to a radius equal to the radius of said collar.

6. A device as described in claim 1 wherein said cutter roll includes a circular collar member fixed on one end thereof, said collar having a radius equal to the radius of said cutting blade and being positioned to contact said cutting bar to hold said bar out of contact with said roll whereby a web of paper may be passed therebetween when said roller is stationary.

7. A device as described in claim 1 wherein said cutter bar axis is positioned relative to the axis of said cutter roll to cause the shearing edge of said bar to contact said blade such that the angle between the roll radius at the point of contact and the cutter bar surface adjacent said cutting edge form an angle with said radius of more than 90°.

8. A device as described in claim 7 wherein the axis of said cutter bar and said cutter roll are not parallel.

9. A device as described in claim 1 further defined by an L-shaped lever pivotally mounted in said frame member, said lever having a slot in the foot thereof adapted to engage an end of said cutter bar so that the bar may be manually moved out of contact with the blade member.

10. A rotary paper cutter for cutting slits in a continuous web of paper which comprises a frame member having a pair of spaced apart end plates;

a cutter bar pivotally mounted in said end plates, a cutter roll rotatably mounted between said end plates in operative relationship to said cutter bar, said cutter roll being mounted for axial movement relative to said cutter bar motor drive means operatively connected to rotate said cutter roll, a cutting blade mounted on the circumference of said cutter roll that moves in contact with the cutter bar to cut a web of paper positioned therebetween when said roll is rotated, at least one cam member extending about the periphery of said cutter roll at one end thereof, said cam means having a contour when in contact with said cutter bar that will lift said cutter bar from contact with said cutter blade for at least a portion of a revolution of said cutter roll, and solenoid means for positioning said cutter roll to engage and disengage said cam means with said cutter bar.

11. A device as described in claim 10 further defined by control means operatively connected to said drive means and said solenoid means to normally position said cutting blade out of contact with said cutter bar except when said solenoid means and said drive means are actuated.

12. A device as described in claim 10 wherein said cam means has a raised portion extending through a segment of twenty to thirty degrees of rotation thereof to lift the cutter bar from contact with said cutting blade for twenty to thirty degrees of rotation thereof so as to only partially slit a web of paper positioned therebetween to leave a narrow tab of paper joining discreet sections of web throughout the length of the continuous web.

13. A rotary paper cutter for cutting a continuous web of paper which comprises a frame member, a cutter roll having a cutting blade fixed thereon rotatably mounted in said frame member, a circular collar member mounted on one end of said cutter roll having a radius equal to the radius of said cutting blade and a cam member mounted on the other end of said cutter roll having a radius greater than the radius of said cutting blade for a portion of the circumference thereof, a cutter bar pivotally mounted in said frame member means urging said cutter bar into contact with said collar member, means for selectively moving said cutter bar in to and out of contact with said cam member so that a web of paper positioned between said cutter roll and cutter bar will be sheared apart upon rotation of said cutter roll except when said cutter bar is moved to engage said cam member.

* * * * *